Aug. 11, 1931.  I. C. HESS  1,818,328
WINTER FRONT FOR AUTOMOBILE RADIATORS
Filed Jan. 23, 1930
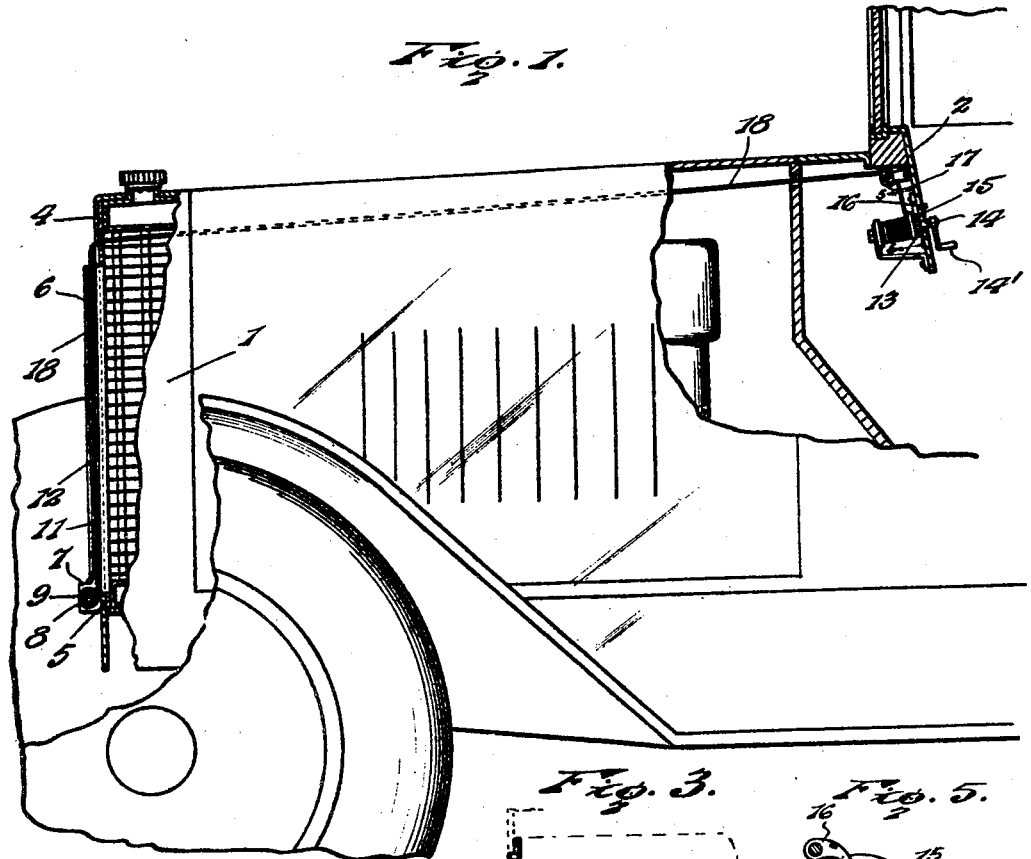
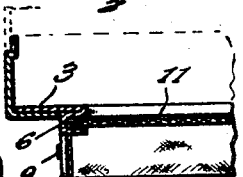
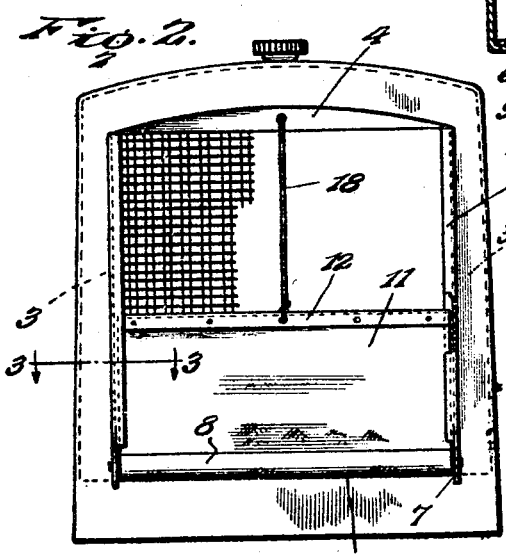
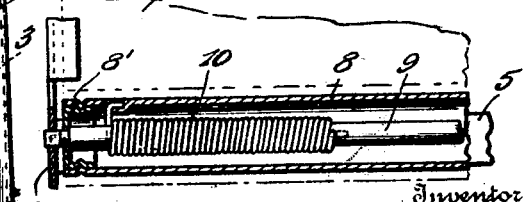
Inventor
I. C. Hess.

Patented Aug. 11, 1931

1,818,328

UNITED STATES PATENT OFFICE

ISAAC C. HESS, OF FERN, PENNSYLVANIA

WINTER FRONT FOR AUTOMOBILE RADIATORS

Application filed January 23, 1930. Serial No. 422,899.

This invention relates to an improved winter front for automobile radiators.

One object of the invention is to provide a winter front which will effectually cover the honey comb of an automobile radiator and aid in preventing the freezing of liquids carried in the radiator tubes.

Another object of the invention is to provide a winter front which may be controlled from the instrument board of the vehicle to which the device is applied.

A further object of the invention is to provide a device of this character which may be easily attached to or detached from an automobile radiator.

Still further objects of the invention not specifically mentioned in the foregoing will appear during the course of the following description.

In the drawings:

Figure 1 is a sectional view showing the device in operative position on an automobile, a part of the automobile being shown in elevation.

Figure 2 is a front elevation of the device partly broken away and shown in section.

Figure 3 is a sectional view on the line 3—3 of Figure 2, looking in the direction indicated by the arrows.

Figure 4 is a fragmentary sectional view showing more clearly how the roller employed is mounted.

Figure 5 is a fragmentary sectional view on the line 5—5 of Figure 1, looking in the direction indicated by the arrows.

Referring now to the drawings, I have illustrated the forward portion of a conventional automobile of the water cooled type which includes a radiator 1 comprising upper and lower tanks, tubes connecting the tanks, and a shell surrounding the tanks and tubes, all of which parts are of conventional design. The usual automobile instrument board is indicated by the numeral 2.

The improved winter front forming the subject of the present invention includes a frame which is preferably formed from a single piece of resilient sheet metal and comprises side rails 3 joined at their ends by a relatively wide upper rail 4 and a relatively narrow lower rail 5. As seen more clearly in Figure 1 of the drawings, the outer margins of the upper and lower rails of the frame are rigidly clamped between the shell and the front walls of the upper and lower tanks of the radiator while the side rails of said frame are tightly held beneath the side portions of the shell so as to prevent rattling of said frame when in position. Also, the use of securing bolts for the frame is thus obviated. It is, of course, to be understood that the outer margins of the rails are shaped to conform to the shell of the radiator to which the device is to be applied.

As seen in Figure 3 of the drawings, the inner margins of the side rails 3 are bent upon themselves and bowed outwardly to form substantially U-shaped guide channels 6 which terminate near the bottom of the radiator. Below said channels, the inner margins of the side rails are bent at right angles to provide flat forwardly widened mounting plates 7, and, as seen in Figure 1 of the drawings, these plates are notched adjacent the lower rail 5 of the frame to snugly accommodate the upper margin of the lower front plate of the radiator shell.

Removably supported by the mounting plates 7 is a roller 8 having end plugs 8' and journalling said plugs is a shaft 9, the ends of which are squared and anchored in the plates 7. Surrounding the shaft 9 is a coil spring 10, one end of which is anchored in said shaft, the other end of said spring being anchored in the roller. Wound about the roller is a curtain 11 which is formed preferably of a heavy insulating fabric. Riveted or otherwise secured to the free end portion of the curtain is a preferably metal reinforcing strip 12 and, as may be readily seen, the ends of said strip as well as the side margins of the curtain are freely received in the guides 6. It is pointed out that, when the device is in operative position, the spring 10 is always held under tension which maintains the curtain under tension also. It is further pointed out that the reinforcing strip is of sufficient width and thickness so that said strip will, when the curtain is lowered, strike the upper edge of the front plate of the radiator shell and will thus be prevented from slipping between said plate and the roller, while the ends of said strip will be prevented from sliding out of the channels at the lower ends thereof. Thus danger of free rotation of the roller is overcome.

Removably mounted on the instrument board 2 is a windlass including a drum 13 and journalling said drum is a shaft 14 on one end of which is formed a crank 14' while the other end of the shaft extends through the instrument board and is fixed thereto. Fixed to the shaft is a ratchet wheel 15 and pivoted upon the instrument board to coact with said wheel is a pawl 16 normally engaging the wheel for limiting the drum against counter-rotation. Mounted upon the instrument board above the windlass is a pulley 17 and wound about the drum 13 of the windlass is a preferably flexible wire cable 18. The free end of the cable is passed about the pulley, thence through the dash, thence longitudinally of the hood, thence through the honey comb of the radiator, thence through the upper rail 4 of the frame medially thereof, and finally, the end portion of the cable is passed through the reinforcing strip medially thereof and tied to said strip.

In operation, when it is desired to raise the curtain and cover the honey comb portion of the radiator, the drum 13 of the windlass is rotated by turning the crank 14¹, when the cable 17 will raise the curtain to the desired height. When the crank is released, the pawl 16 will engage the ratchet wheel 15 and prevent counter-rotation of the drum. When it is desired to lower the curtain, the pawl is released from the ratchet wheel, when the spring 10 will automatically wind the curtain upon the roller 8.

If it should be desired to remove the device, the cable is first untied from the reinforcing strip and wound upon the windlass. The roller is then removed from the frame by spreading the resilient plates 7. The shell of the radiator is then removed, when the frame may be easily removed from said shell.

What is claimed is:

1. A device of the class described including, in combination with a radiator having a shell provided with a lower front plate, a frame having side rails clamped by the shell, said side rails being provided with guide channels, mounting plates carried by said side rails at their lower ends, said mounting plates being notched to accommodate the upper margin of the lower plate of the shell, a roller supported by the mounting plates, and a curtain wound about said roller and being movable in the guide channels.

2. A device of the class described including a frame comprising a relatively wide upper rail and a relatively narrow lower rail connected with each other by side rails bent to form guide channels, portions of the side rails being bent forwardly at the lower ends of said channels to provide mounting plates notched adjacent said lower plate to accommodate the upper margin of the lower front plate of a radiator shell, a spring actuated roller carried by said mounting plates, a curtain carried by the roller and having its side margins freely movable in said guide channels, and means connected with the curtain for raising said curtain.

In testimony whereof I affix my signature.
ISAAC C. HESS.